May 7, 1968  H. HIRSCHBERG  3,382,421
TRIMMER CAPACITOR
Filed Jan. 20, 1967
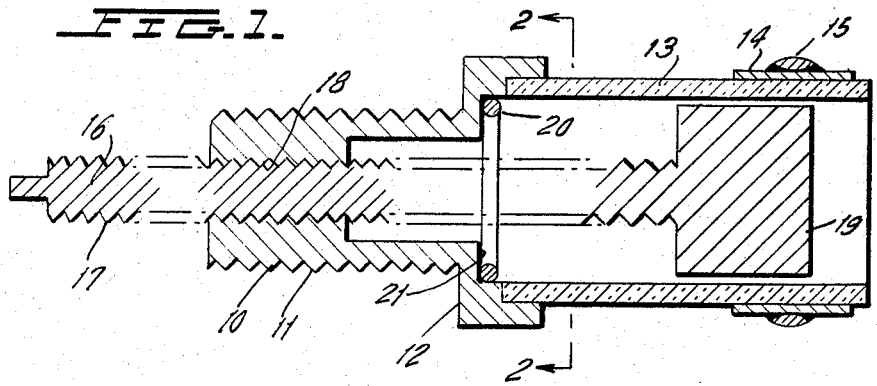
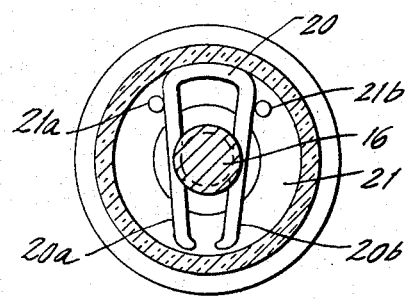
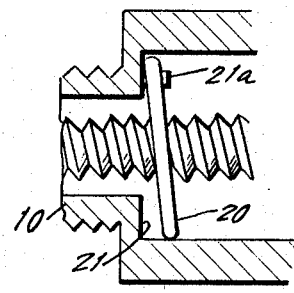
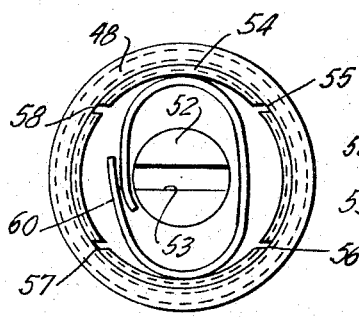
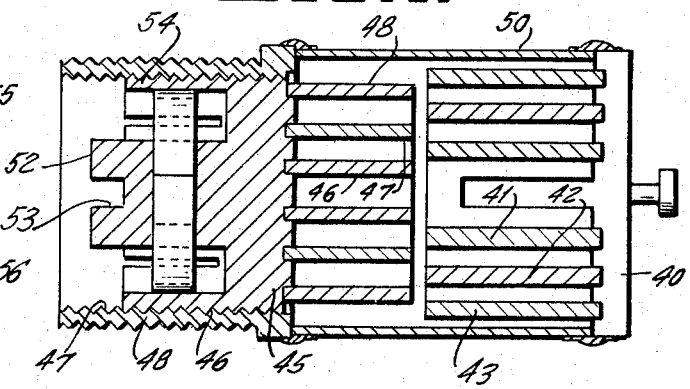
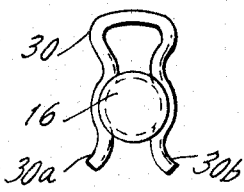
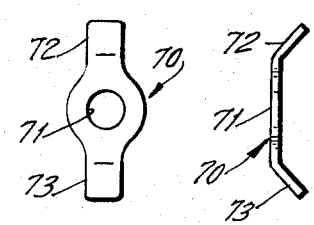
INVENTOR.
HERZ HIRSCHBERG
BY
OSTROLENK, FABER, GERB & SOFFEN
ATTORNEYS United States Patent Office 3,382,421
Patented May 7, 1968

3,382,421
TRIMMER CAPACITOR
Herz Hirschberg, New York, N.Y., assignor to JFD Electronics Company, a division of Stratford Retreat House, Brooklyn, N.Y., a corporation of New York
Filed Jan. 20, 1967, Ser. No. 610,637
6 Claims. (Cl. 317—249)

ABSTRACT OF THE DISCLOSURE

A flat spring clip device grips a screw thread in its pitch diameter and extends over one pitch length. A portion of the spring extends beyond the outer diameter of the screw and is connected by friction, by fitting, or by welding to a fixed body which threadably receives the screw thread. This holds the spring from rotating with the screw and the spring exerts an inward force on the screw to set the adjustment torque for the screw. The spring is also placed under cantilever strain so that the screw is also biased in one direction to absorb back-lash. A flat spring is also connected to the interior of a split bushing having an exterior thread with the single flat spring biasing the exterior threads into engagement with a cooperating interior thread which receives a split bushing.

This invention relates to trimmer capacitors, and more specifically relates to a novel spring structure for imparting both radial and axial forces to the adjustment screw of a trimmer capacitor. Trimmer capacitors are well known to the art and are generally comprised of a conductive piston which is movable within a dielectric cylinder which has an electrode secured thereto. As the piston moves with respect to the electrode on the dielectric cylinder, the capacitance between the two will be changed. To permit extremely accurate adjustment of the spacing between the piston and the electrode, the piston is frequently connected to a screw which is threadably carried in a support bushing which contains the complete capacitor assembly. Thus, the dielectric cylinder will extend from one portion of the bushing while the adjustment screw is threaded with respect to a different portion of the cylinder so that when the adjustment screw is rotated, the piston will be moved axially along the dielectric cylinder.

In accordance with one feature of the present invention, a novel flat spring having a general U-shape is snapped over the pitch diameter of the screw along one pitch length of the screw. A portion of the spring and preferably the portion at which the legs are joined together to form the base of the U-shape is then fastened in any desired manner to a fixed point on the support bushing so that the screw which rotates with respect to the bushing will also rotate with respect to the spring. The spring will then exert radial forces against screw rotation thereby to set some minimum torque value required to rotate the screw, and at the same time will exert an axial force on the spring in order to absorb back-lash.

As a second embodiment of the invention, a simple flat spring may be applied to the split bushing-type device wherein adjustment of the movable capacitor electrode is obtained by rotating the split bushing with respect to a mounting bushing. In this instance, the single flat spring is contained interiorly of the split bushing and biases the split bushing outwardly and into engagement with the cooperating threads on the interior of the mounting bushing.

Accordingly, a primary object of this invention is to provide a novel radial and axial force exerting device for trimmer capacitors.

Yet another object of this invention is to provide a novel, inexpensive U-shaped spring for trimmer capacitors for eliminating axial and radial back-lash.

These and other objects of the present invention will become apparent from the following description when taken in connection with the drawings, in which:

FIGURE 1 is a cross-sectional view of a typical trimmer capacitor which employs the novel U-shaped spring device of the invention.

FIGURE 2 is a cross-sectional view of FIGURE 1 taken across the section line 2—2 in FIGURE 1.

FIGURE 3 is an enlarged broken-away view illustrating the manner in which the novel spring grips the screw in accordance with the invention.

FIGURE 4 illustrates an alternate spring shape for the novel spring of the invention.

FIGURE 5 shows a second embodiment of the invention incorporating a split bushing structure.

FIGURE 6 is a bottom view of FIGURE 5.

FIGURE 7 is a top plan view of a second embodiment of a spring which can be used in FIGURES 5 and 6.

FIGURE 8 is a side view of FIGURE 7.

Referring first to FIGURES 1, 2 and 3, there is illustrated a typical trimmer capacitor composed of a metallic mounting bushing 10 having a threaded exterior 11 which leads to a mounting flange 12. Bushing 10 then carries a dielectric cylinder 13 thereon in the usual manner which has an electrode 14 secured thereto which may receive a pigtail lead 15 for ease of connection. An adjustment screw 16, having an exterior thread 17, is then threaded into the internal thread 18 of bushing 10 as shown. A piston 19 is then connected to the end of the adjustment screw 16, whereupon rotation of the adjustment screw 16 will alter the axial position of piston 19 thereby to change the capacitance between electrode 14 and the piston 19.

In devices of the type described to this point which are old and well known, it is desirable to provide some means to prevent the accidental rotation of screw 16 after it has been placed in some adjusted position. That is, it is desirable that some torque above some predetermined value be required to rotate screw 16. In addition, in order to make adjusted capacitance values reproducible, it is necessary to provide additional means for absorbing the back-lash in the engagement between threads 17 and 18. Note that if threads 18 of FIGURE 1 did not exist, spring 20 would serve additionally as a single turn thread for screw 16.

In accordance with the present invention, a single U-shaped flat spring wire or clip 20 is provided which has a generally U-shape with legs 20a and 20b (FIGURE 2) passing across the width of screw 16 and engaging the pitch diameter of the screw 16 with some predetermined spring force. Note that screw 16 can be assembled on spring 20 by either threading the screw through the spaced legs 20a and 20b, or by snapping the spring 20 over the screw 16. In addition, the base portion of spring 20 seats on flange 21 formed interiorly of bushing 10 with the base portion of spring 20 suitably fixed to flange 21. By way of example, spring 20 could be soldered or welded at its base to flange 21 or alternatively and as illustrated in FIGURES 2 and 3, the base 21 may have extending projections 21a and 21b adjacent the sides of the base to resist rotation of spring 20 when the adjustment screw 16 is rotated.

In asembling the device, the spring 20 may be first snapped over adjustment screw 16 and the adjustment screw thereafter loaded into the bushing and threaded downwardly with spring 20 rotating with the spring until it meets the bushing base portion 21. As rotation of screw 16 is continued, the projections 21a and 21b will prevent rotation of spring 20 with a cantilever force being exerted on spring 20 to absorb axial back-lash between threads 17 and 18 while the radial force of legs 20a and 20b of spring 20 gripping the pitch diameter of one pitch length of screw 16 establish a predetermined torque required to rotate adjustment screw 16.

Alternatively, the spring 20 can be initially soldered or welded to base portion 21, initially lying perpendicular to the axis of bushing 10. The screw is thereafter assembled through dielectric tube 13 being first threaded through the legs 20a and 20b of the screw and thereafter threaded into thread 18 of bushing 10. Once again, when thread 17 enters thread 18 the assembler will insure a suitable cantilever force on screw 20 to pre-adjust the required axial back-lash before threading the screw 16 into thread 18.

It will be apparent that the generally U-shaped spring of FIGURES 1, 2 and 3 could take any of various shapes. By way of example, FIGURE 4 illustrates a spring 30 which could be used and which has a generally U-shape where, however, the ends of its legs are outwardly flared as legs 30a and 30b to simplify the snapping of the spring over the pitch diameter of the adjustment screw 16 before assembly into the bushing.

FIGURES 5 and 6 illustrate a second type of capacitor which is composed of a main stator body 40 which has a series of conductive concentric tubes 41, 42 and 43 extending therefrom to define the stator plates of a trimmer capacitor. A rotor is then formed of a conductive rotor body 45 which has a series of conductive concentric tubes 46, 47 and 48 extending therefrom and which, as will be seen hereinafter, are axially movable to nest with plates 41, 42 and 43 in order to adjust the capacitance between the two series of plates. Conductive rotor body 45 has an exterior thread 46 which is threadably received by the interior threads 47 of a main mounting bushing 48 which may have an exterior thread for mounting purposes. The main mounting bushing 48 then has an insulation tube 50 extending therefrom which is connected to the stator plate 40 at its upper end. Rotor body 45 is then provided with an annular opening 51 to define an interior extending portion 52 having a spring driver slot 53 therein and an exterior flange 54. Exterior flange 54 is then slotted as by slots 55, 56, 57 and 58 best shown in FIGURE 6.

In accordance with this aspect of the invention, a flat spring 60, formed in the FIGURES 5 and 6 of a single coil of a suitable spring wire material, is inserted in annular cavity 51 and bears against portions of the split bushing 54 in order to bias these portions outwardly and into firm engagement with the interior thread 47 of the main mounting bushing 48. Thus, the simple spring 60 will then prevent accidental rotation of rotor body 45 and will require that at least some predetermined torque be used in order to rotate rotor body 45. In addition, this novel arrangement will act to absorb some axial back-lash in the device.

It will be apparent that a wide variety of spring shapes could be used for the spring 60. By way of example, FIGURES 7 and 8 illustrate a simple stamped spring 70 having a central opening 71 which would fit over central projection 52 in FIGURE 5 with upwardly bent legs 72 and 73 which bear against the interior walls of bushing 54 in order to bias the split legs thereof outwardly to obtain firm engagement between threads 46 and 47.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. In a trimmer capacitor comprising a support bushing; an insulation cylinder extending from a portion of said support bushing; an electrode connected to said insulation cylinder, a piston axially movable within said insulation cylinder; an exteriorly threaded adjustment screw connected to said piston and threadably connected to said support bushing whereby rotation of said adjustment screw causes said piston to traverse axially within said insulation cylinder; the improvement which comprises a flat U-shaped spring having opposing legs disposed on opposite sides of said adjustment screw and disposed in the pitch diameter of the thread of said screw; the base of said U-shaped spring extending axially beyond said screw and connected to a fixed interior portion of said bushing.

2. The device as set forth in claim 1 wherein said bushing has an internal shoulder therein surrounding said adjustment screw and radially spaced therefrom; said base of said U-shaped spring secured to said internal shoulder.

3. The device as set forth in claim 2 wherein said spring is under cantilever strain, thereby to bias said adjustment screw in an axial direction.

4. The device as set forth in claim 2 wherein said opposing legs of said spring are biased toward one another, thereby to grip said pitch diameter of said screw with a positive force.

5. The device as set forth in claim 3 wherein said opposing legs of said spring are biased toward one another, thereby to grip said pitch diameter of said screw with a positive force.

6. The device as set forth in claim 1 wherein said spring has a thickness less than the spacing between adjacent threads on said adjustment screw.

References Cited

UNITED STATES PATENTS 2,595,194  4/1952  Heibel _____ 317—249

DARRELL L. CLAY, *Primary Examiner.*

E. GOLDBERG, *Assisant Examiner.*